(No Model.)
A. H. MORRISON.
BOX COVERING MACHINE.
No. 585,921. Patented July 6, 1897.
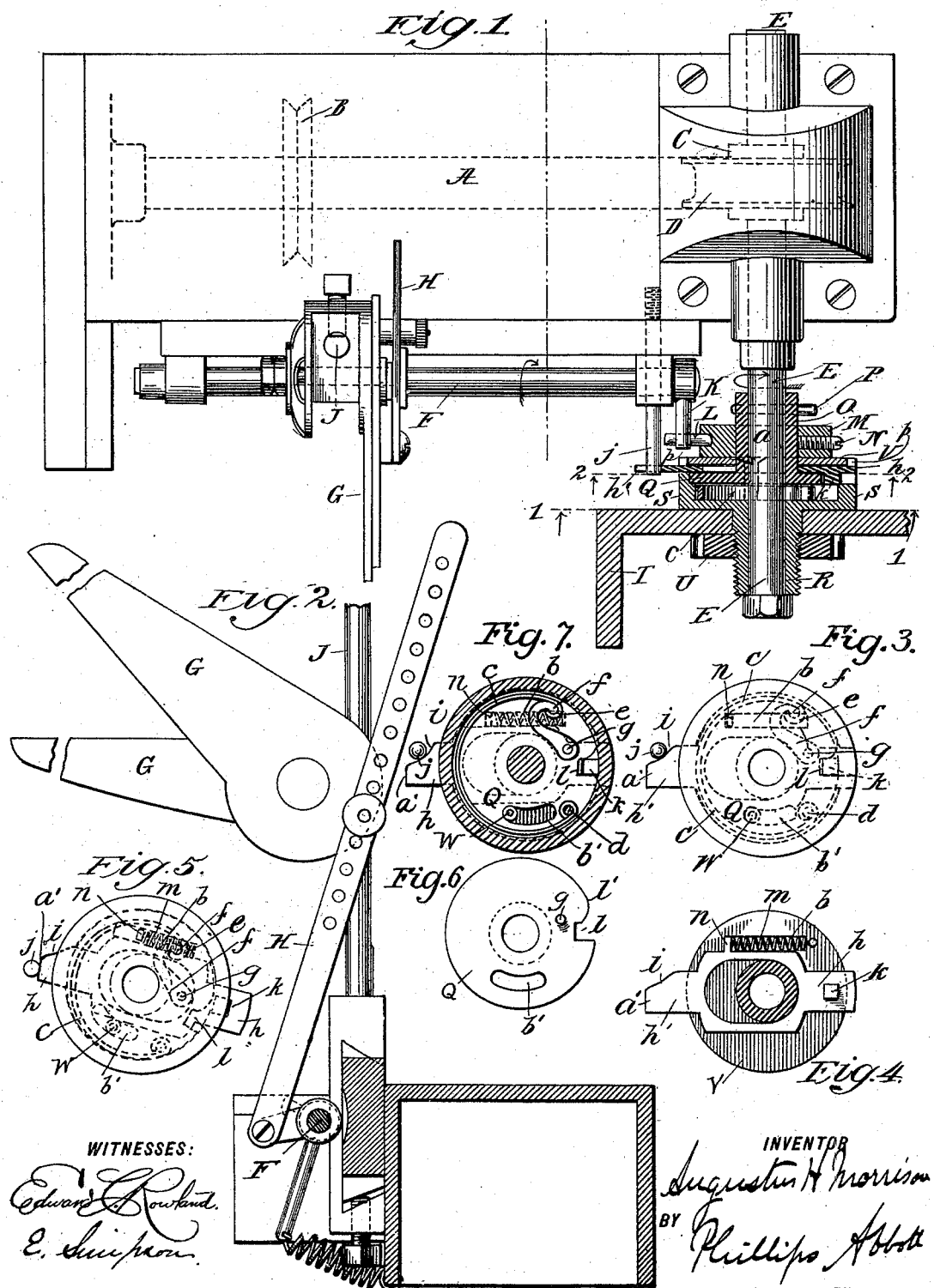
WITNESSES:
Edward Rowland.
E. Simpson.
INVENTOR
Augustin H Morrison
BY Phillips Abbott
ATTORNEY

UNITED STATES PATENT OFFICE.

AUGUSTUS H. MORRISON, OF AMSTERDAM, NEW YORK, ASSIGNOR TO THE AMERICAN BOX MACHINE COMPANY, OF SAME PLACE.

BOX-COVERING MACHINE.

SPECIFICATION forming part of Letters Patent No. 585,921, dated July 6, 1897.

Application filed April 22, 1896. Serial No. 588,691. (No model.)

*To all whom it may concern:*

Be it known that I, AUGUSTUS H. MORRISON, a citizen of the United States, and a resident of Amsterdam, in the county of Montgomery and State of New York, have invented certain new and useful Improvements in Box-Covering Machines, of which the following is a specification.

My invention relates to cut-off attachments for paper-box-covering machines of the class for which Letters Patent of the United States were issued to Horace Inman, dated January 10, 1888, No. 376,096, to which patent I refer for a better description of the parts and their operation, and consequently in this specification for the sake of brevity I will refer incidentally only to that which is shown in said former patent. In the operation of the machine patented in and by the said Inman patent after the covering-paper had been severed by the shears it was necessary for the operator to turn the box-form by hand backwardly toward himself a trifle in order to reëngage the engaging devices between the box-form or its support and the continuously-rotating shaft on which the box-form is supported, and it sometimes happens that through carelessness on the part of the operator this act is not performed, resulting in a delay and perhaps the loss of the stock. By my present invention I provide devices whereby this reengagement of the parts is automatic and the operator has to do nothing. The machine will relock itself.

Referring to the drawings, Figure 1 illustrates a plan partly in section. Fig. 2 illustrates an elevation, partly in section, of the shears and their coacting parts. Fig. 3 illustrates a detail of the parts especially involved in the invention, taken on the line 1 1 of Fig. 1, looking in the direction of the arrows. Fig. 4 illustrates a sectional view on the line 2 2 of Fig. 1. Fig. 5 illustrates the parts shown in Fig. 3 in their retarded position. Fig. 6 illustrates a detail of the hub and disk, which are fixed upon the box-form shaft. Fig. 7 is a cross-sectional view in detail, representing more clearly the parts shown in Fig. 3.

I will first briefly describe the parts of the machine referred to in the said Inman patent.

A is the main shaft. B is the driving-pulley. C is a worm on the main shaft. D is the worm-gear on the box-form shaft. E is the box-form shaft. F is the shaft which operates the shears. G are the shears. H is the adjustable connecting-rod, connecting the shears with the shaft F. J is the vertical support for the shears, upon which they may be adjusted. K is the pin on the shaft F, which is actuated by the pin L, which projects laterally from a disk M, which is fastened rigidly by a set-screw N to a hub O, which is fastened rigidly by the key P to the box-form shaft E, and on the hub O is formed the flange or disk Q. Consequently the parts O, M, and Q always revolve with the box-form shaft E, all the same as in said former patent. R is a hub carrying the cup-shaped flange or disk S, upon which the box-form T is clamped by a threaded hand-nut U, which engages with threads upon the exterior of the hub R. These parts are loose upon the shaft E and do not turn with it, excepting when they are locked to it by the means about to be described.

Referring now to the parts more immediately involved in my invention, it will be noted that the flange Q on the hub O is located within the cup-shaped disk or flange S on the hub R, and the open face of this cup-shaped flange is closed by a plate V, which is attached to the cup-shaped flange by means of a stud W and screw $a$, and in the face of this plate there is a slot $b$. $c$ is a spring inclosed in the lower part of the cup-shaped flange. It is fastened, as at $d$, (see Fig. 3,) to it, the other end $e$, which is pivotally connected with the book-shaped part $f$, which is pivotally connected by means of a pin $g$ with the disk Q on the hub O. $h$ is a sliding dog, one end of which, $h'$, projects laterally beyond the sides of the cup-shaped disk S and has a cam-like surface $i$, which engages with a pin $j$ or other stationary obstruction during the rotation of the parts, and the dog $h$ has on its under side a stud $k$, which engages in a recess or notch $l$, made in the flange Q of the hub O. $m$ is a spiral spring which fits in the slot $b$, which abuts at one end against the end of that slot and at the other end against a lug $n$ on the sliding dog $h$. The dog, as shown, is recessed centrally, so that the hub O is utilized as a slideway for it, and the sides of the cup-shaped flange S are likewise recessed, so as to afford a seat or space through which the dog $h$ can slide, and these recesses are made to fit the width of the dog somewhat nicely, so that the edges of the dog, impinging against the edges of the recess, compel the cup-shaped flange and the box-form support upon it to revolve when the dog revolves.

The operation is as follows: The spring $m$, by reason of its action against the lug $n$ on the side of the dog $h$, normally throws the dog to the left, as shown in Figs. 1, 3, and 4, and when in this position the stud $k$ upon the dog lies within the notch $l$ in the flange Q of the hub O, and since that hub is rigidly fast to the continuously-revolving shaft E of course the dog continually revolves with it, and by reason of the engagement of the edges of the dog with the sides of the recesses $p$ in the cup-shaped flange S that part also to which the box-form is attached is normally compelled to revolve. The construction of the parts and their assemblage are such that the "timing" is substantially as follows: Just before the pin L on the disk M engages with the arm K to actuate the shears the stationary pin or obstruction $j$ engages with the cam-shaped surface $i$ of the dog $h$, and as the parts revolve the dog by the stated engagement is shoved rearwardly until it acquires a position shown in Fig. 5, and when in that position the stud $k$ is entirely removed from the notch $l$ in the flange Q of the hub O, so that there is nothing to drive the cup-shaped flange S and its hub and the box-form supported by it. Consequently the strength of the paper prevents the rotation of these parts, and the box-form comes to rest. To facilitate the removal of the stud $k$ from the notch, I ordinarily round the rear edge of the notch, as shown at $l'$, in order that it may free itself quickly. The pin or other obstruction $j$, riding up upon the flat face $a'$ of the dog, holds it in its retracted position. The flange Q has meantime continued in its rotation until the stud W has passed to the other end of slot $b'$, (see Figs. 3 and 6,) and during this rotation the hook $f$ has been putting the spring $c$ under tension, one end of which, as already stated, is attached to the cup-shaped flange S, which, however, is held by the paper, and has carried the notch $l$ out of registration with the stud $k$ on the dog, and when the shears, which have meantime operated as usual, have severed the paper, there being then nothing to hold the cup-shaped disk S, the spring $c$ instantly rotates the box-form, carrying the dog away from engagement with the pin $j$, and returns the notch $l$ into registration with the stud $k$ on the dog. Thereupon the spring $m$, which has been put under tension by the retraction of the dog, again throws it to the left and the lug $k$ again enters the notch in the disk Q. Thus the parts are returned to their initial position ready for a second operation.

It will be obvious to those who are familiar with this art that modifications may be made in the details of construction without essentially departing from the spirit of the invention. I therefore do not limit myself to such details.

I claim—

1. In a machine for covering paper boxes, the combination of an intermittently-rotating box-form mounted on a continuously-rotating shaft, a device on the shaft for actuating a cut-off, and means actuated by the rotation of the shaft, which unlocks and locks the box-form to the shaft, for the purposes set forth.

2. In a machine for covering paper boxes, an intermittently-rotating box-form, mounted on a continuously-rotating shaft, a device on the shaft for actuating a cut-off, and a reciprocating dog for unlocking and locking the box-form to the shaft, and a stationary device which engages with the dog at a point in its rotation whereby it is retarded, for the purposes set forth.

3. In a machine for covering paper boxes, the combination of an intermittently-rotated box-form, mounted on a continuously-rotating shaft, a device on the shaft for actuating a cut-off, and a reciprocating dog for unlocking and locking the box-form to the shaft, and a stationary device with which the dog engages during a part of its rotation, whereby it is retarded, and a spring for projecting the dog again, for the purposes set forth.

4. The combination in a box-covering machine of a continuously-rotating shaft carrying a device for operating a cut-off, and a box-form loosely mounted upon such shaft, a movable device constructed and arranged to unlock and lock the support for the box-form to the continuously-rotating shaft, and means, located in the path of said device, whereby it is actuated during the rotation of the shaft, for the purposes set forth.

Signed at Amsterdam, in the county of Montgomery and State of New York, this 17th day of April, A. D. 1896.

AUGUSTUS H. MORRISON.

Witnesses:
H. A. INMAN,
ROBT. N. CLARK.